(12) United States Patent
Atsuta et al.

(10) Patent No.: US 12,311,590 B2
(45) Date of Patent: May 27, 2025

(54) MOLDING MACHINE MANAGEMENT DEVICE

(71) Applicant: Seiko Epson Corporation, Tokyo (JP)

(72) Inventors: Kosuke Atsuta, Shiojiri (JP); Hiroki Minowa, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 350 days.

(21) Appl. No.: 17/824,951

(22) Filed: May 26, 2022

(65) Prior Publication Data

US 2022/0379538 A1  Dec. 1, 2022

(30) Foreign Application Priority Data

May 27, 2021  (JP) .................................. 2021-089067

(51) Int. Cl.
*B29C 45/76* (2006.01)

(52) U.S. Cl.
CPC .......... *B29C 45/768* (2013.01); *B29C 45/766* (2013.01); *B29C 2045/7606* (2013.01); *B29C 2945/76163* (2013.01); *B29C 2945/76946* (2013.01); *B29C 2945/76949* (2013.01)

(58) Field of Classification Search
CPC ................ B29C 45/768; B29C 45/766; B29C 2045/7606; B29C 2945/76163; B29C 2945/76946; B29C 2945/76949
See application file for complete search history.

(56) References Cited

U.S. PATENT DOCUMENTS

| | | | | |
|---|---|---|---|---|
| 5,062,052 A | * | 10/1991 | Sparer | ..................... B29C 45/76 700/84 |
| 7,496,427 B2 | * | 2/2009 | Konishi | .................. B29C 45/76 700/197 |

FOREIGN PATENT DOCUMENTS

| | | | | |
|---|---|---|---|---|
| EP | 3546182 A1 | * | 10/2019 | ............. B29C 45/76 |
| JP | 2004-074726 A | | 3/2004 | |
| JP | 2004-198148 A | | 7/2004 | |

* cited by examiner

*Primary Examiner* — Elias Desta
(74) *Attorney, Agent, or Firm* — Harness, Dickey & Pierce, P.L.C.

(57) ABSTRACT

A molding machine management device that is able to couple to a molding machine includes a storage unit configured to store, in chronological order, numerical value information on a molding process when a molded product is molded by the molding machine and four-factor information on four factors of production which includes a man, a machine, a material, and a method when the molded product is produced, and an output control unit configured to classify the numerical value information into a plurality of groups for periods divided according to time when the four factors of production changes, and output the numerical value information classified into the plurality of groups to an output unit in group units.

2 Claims, 7 Drawing Sheets

MOLDING MACHINE MANAGEMENT DEVICE

The present application is based on, and claims priority from JP Application Serial Number 2021-089067, filed May 27, 2021, the disclosure of which is hereby incorporated by reference herein in its entirety.

BACKGROUND

1. Technical Field

The present disclosure relates to a molding machine management device.

2. Related Art

JP-A-2004-074726 discloses a management device that displays a band graph illustrating operating status of a molding machine, and an item and a molding condition of a molded product, a line illustrating time when an abnormality occurred in the molding machine, and a line graph illustrating a numerical value related to the molding condition along the same time axis. The management device displays different band colors of the band graph before and after a change occurs in the operating status of the molding machine, or the item or the molding condition of the molded product.

In the production of molded products, changes in any of the four factors of production which includes a man, a machine, a material, and a method may change a preferred range of a numerical value related to a molding condition. In the above-described management device, a timing at which the operating status of the molding machine, or the item or the molding condition of the molded product is changed is indicated by the band graph. However, there is room for further ingenuity in order to facilitate analysis of the numerical value related to the molding condition.

SUMMARY

According to one aspect of the present disclosure, a molding machine management device that is able to couple to a molding machine is provided. The molding machine management device includes a storage unit configured to store, in chronological order, numerical value information on a molding process when a molded product is molded by the molding machine and four-factor information on four factors of production which includes a man, a machine, a material, and a method when the molded product is produced, and an output control unit configured to classify the numerical value information into a plurality of groups for periods divided according to time when the four factors of production changes, and output the numerical value information classified into the plurality of groups to an output unit in group units.

DESCRIPTION OF EXEMPLARY EMBODIMENTS

A. First Embodiment

Figure 1:
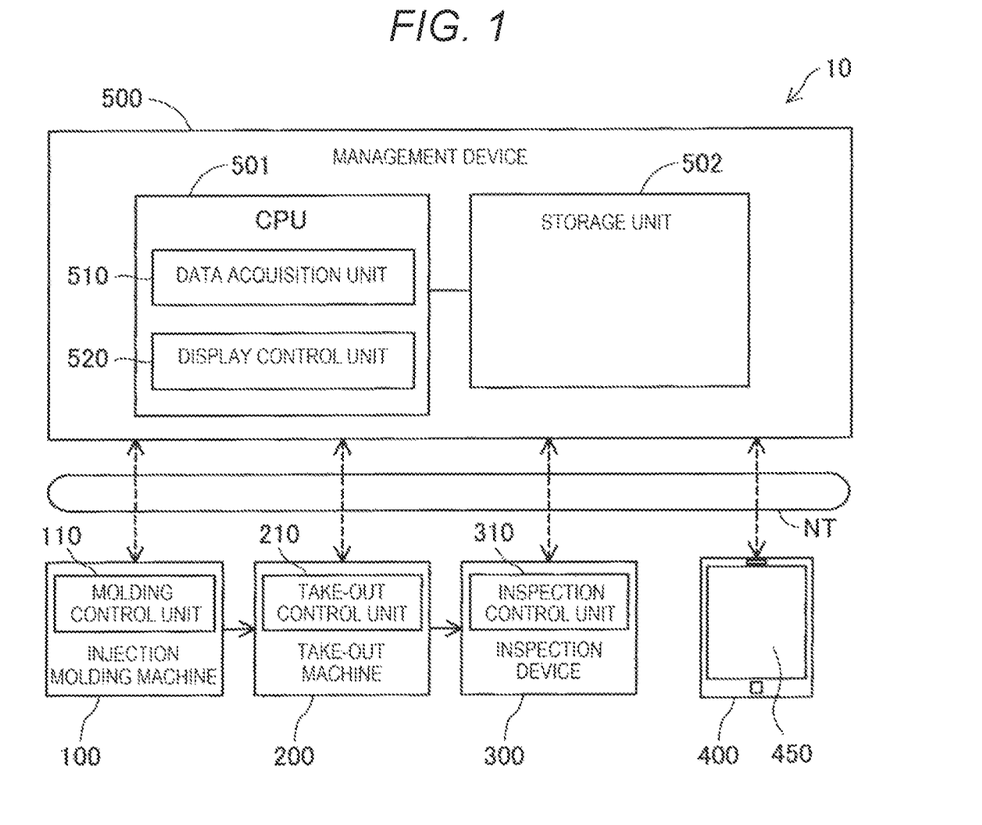
FIG. 1 is an explanatory diagram illustrating a schematic configuration of a molding machine management system.

FIG. 1 is an explanatory diagram illustrating a schematic configuration of a molding machine management system 10 including a molding machine management device 500 according to a first embodiment. The molding machine management system in the present embodiment includes an injection molding machine 100, a take-out machine 200, an inspection device 300, a terminal device 400, and the molding machine management device 500. In the following description, the molding machine management device 500 may be simply referred to as the management device 500.

In FIG. 1, a flow of a molded product produced by the molding machine management system 10 is illustrated by solid line arrows. In the molding machine management system 10, the molded product is molded by the injection molding machine 100, the molded product is taken out from the injection molding machine 100 by the take-out machine 200 and conveyed to the inspection device 300, and the molded product is inspected by the inspection device 300. A device used for producing the molded product together with the injection molding machine 100, such as the take-out machine 200 or the inspection device 300, may be referred to as a peripheral device.

The injection molding machine 100 includes a molding control unit 110, and an injection device and a mold clamping device which are both not illustrated. The injection device is provided with a hopper for storing a material of the molded product. The mold clamping device is provided with a molding mold having a cavity. The molding mold may be made of metal, ceramic, or resin. The molding mold made of metal is referred to as a mold.

The molding control unit 110 is configured by a computer including one or a plurality of processors, a storage device, and an input and output interface that inputs a signal from the outside and outputs a signal to the outside. The molding control unit 110 may include a plurality of computers. A take-out control unit 210 of the take-out machine 200 and an inspection control unit 310 of the inspection device 300, which will be described later, have the same configuration as the molding control unit 110.

The molding control unit 110 controls each unit of the injection molding machine 100 to perform injection molding and molds the molded product. More specifically, the molding control unit 110 controls the mold clamping device to clamp the molding mold, and controls the injection device to plasticize the material and inject the plasticized material into the molding mold, thereby molding a molded product having a shape corresponding to a shape of the cavity provided in the molding mold.

The molding control unit 110 transmits numerical data indicating numerical value information on the molding process to the management device 500. The molding process includes a step of opening and closing the molding mold, a step of supplying the material from the hopper to the injection device, a step of plasticizing the material supplied from the hopper, and a step of injecting the plasticized material into the molding mold. In the present embodiment, the numerical data includes set values and measured values of the injection molding machine 100 for each item of molding conditions as the numerical value information on the molding process. The molding conditions include, for example, a plurality of items such as an injection pressure, a mold temperature, and a mold clamping pressure. The set value means a numerical value set in the injection molding machine 100, and the measured value means a numerical value measured by various kinds of sensors provided in the injection molding machine 100. The measured value is associated with time when the measured value is measured or the number of shots, and the set value is associated with the time when the set value is set in the injection molding machine 100 or the number of shots. The number of shots means the number of injection moldings. One injection molding is referred to as one shot. In another embodiment, either the set value or the measured value may not be included in the numerical data. The set value may be associated with the time when the measured value is measured by the injection molding machine 100 or the number of shots.

The take-out machine 200 of the present embodiment includes the take-out control unit 210, a take-out robot, and a cutting machine. The take-out control unit 210 controls actions of the take-out robot and the cutting machine. The take-out robot is, for example, a horizontal multi-articulated robot or a vertical multi-articulated robot. The take-out robot takes out the molded product from the molding mold of the injection molding machine 100. The cutting machine is a device that removes a sprue or a runner, which is molded together with the molded product by the molding mold, from the molded product by cutting. In the present embodiment, the take-out robot grips and takes out, by an end effector attached to a tip of an arm of the take-out robot, the molded product released from the molding mold by an ejector pin of the injection molding machine 100. Thereafter, the sprue and the runner are removed from the molded product by the cutting machine, and the molded product from which the sprue and the runner are removed is conveyed to the inspection device 300 by the take-out robot. In another embodiment, the take-out robot may be, for example, a robot that grips a molded product by vacuum suction. The take-out machine 200 may not include a cutting machine.

The inspection device 300 of the present embodiment includes the inspection control unit 310 and a camera. The inspection control unit 310 controls the camera to capture an image of the molded product, and performs appearance inspection and dimension inspection of the molded product by analyzing the captured image of the molded product.

The inspection control unit 310 generates inspection result data indicating quality information on quality of the molded product molded by the injection molding machine 100, and transmits the inspection result data to the management device 500. In the present embodiment, the inspection result data includes, as the quality information, information on the dimensions of the molded product measured by using the camera, information on a quality judgment result of the molded product, and information on types of defects of the molded product. The types of defects include dimensional defects having a problem with the dimensions of the molded product and appearance defects having a problem with the appearance of the molded product. The inspection result data is associated with the time when the molded product is inspected by the inspection device 300 or the number of shots. In the present embodiment, the inspection result data is automatically generated by the inspection control unit 310, but in other embodiments, an operator may create the inspection result data based on an inspection result carried out according to inspection items. In this case, the inspection result data is input to the inspection control unit 310 via an input unit which is not illustrated, and is transmitted from the inspection control unit 310 to the management device 500.

The terminal device 400 is configured as a computer including a CPU, a storage device and a display unit 450. As the terminal device 400, for example, a tablet terminal, a notebook personal computer, or a smartphone can be applied. In the present embodiment, the display unit 450 is provided with a touch panel function. Various kinds of information output from the management device 500 is displayed on the display unit 450. The display unit 450 may be referred to as an output unit. In another embodiment, the display unit 450 may be provided in the management device 500.

The terminal device 400 transmits, to the management device 500, production condition data indicating various kinds of information including four-factor information on four factors of production for producing the molded product. The four factors of production means four factors which include a man, a machine, a material, and a method. The man means a person who is involved in the production of the molded product, such as an operator who is in charge of operating the injection molding machine 100 or an operator who is in charge of inspection by the inspection device 300. The machine means a machine used for producing the molded product, such as the injection molding machine 100, the take-out machine 200, and the inspection device 300. The material means the material of the molded product. The method means a method for producing the molded product, such as a method for injection molding, a method for taking out the molded product from the molding mold, a method for inspecting the molded product, or the like. The four factors of production may be referred to as 4M, and the four-factor information may be referred to as 4M information.

In the present embodiment, the four-factor information is input to the terminal device 400 by the operator and transmitted from the terminal device 400 to the management device 500. In another embodiment, at least a part of the four-factor information may be input to a device other than the terminal device 400 and transmitted from the device other than the terminal device 400 to the management device 500. For example, at least a part of the four-factor information may be input to the injection molding machine 100 and transmitted from the injection molding machine 100 to the management device 500, for example. Alternatively, at least a part of the four-factor information may be input to the management device 500. The four-factor information may be acquired by the terminal device 400 or the management device 500 from another production system via a network or the like, instead of being manually input. The production condition data may include information on a production lot number of the molded product in addition to the four-factor information. The production lot number may be input to the terminal device 400 and transmitted to the management device 500, for example.

The management device 500 includes a computer including a CPU 501 and a storage unit 502. The storage unit 502 includes a main storage device and an auxiliary storage device.

The management device 500 is communicably coupled to the injection molding machine 100, the take-out machine 200, the inspection device 300, and the terminal device 400. In the present embodiment, the management device 500 is configured to be able to communicate, via a network NT, with the injection molding machine 100, the take-out machine 200, the inspection device 300, and the terminal device 400. The network NT may be, for example, a LAN, a WAN, or Internet. The management device 500 communicates, via the network NT, with the injection molding machine 100, the take-out machine 200, the inspection device 300, and the terminal device 400 to transmit and receive data to and from the injection molding machine 100, the take-out machine 200, the inspection device 300, and the terminal device 400.

The management device 500 includes a data acquisition unit 510 and a display control unit 520. The data acquisition unit 510 and the display control unit 520 are implemented by the CPU 501 executing a program stored in the storage unit 502. The data acquisition unit 510 and the display control unit 520 may also be implemented by a circuit.

The data acquisition unit 510 acquires the numerical data from the injection molding machine 100, acquires the inspection result data from the inspection device 300, and acquires the production condition data from the terminal device 400. The data acquisition unit 510 stores the acquired numerical data, inspection result data, and production condition data in the storage unit 502 in chronological order.

The display control unit 520 causes the display unit 450 to display the numerical value information on the molding process, the quality information on the quality of the molded product, and the four-factor information on the four factors of production of the molded product in the same chronological order. The display control unit 520 classifies the numerical value information, the quality information, and the four-factor information into a plurality of groups for periods divided according to the time when the four factors of production are changed, and causes the display unit 450 to display the numerical value information, the quality information, and the four-factor information in group units. The display control unit 520 uses the numerical data, the inspection result data, and the production condition data stored in the storage unit 502 to generate display data for causing the display unit 450 to display the numerical value information, the quality information, and the four-factor information. The display data includes data for drawing a period display area, a quality information display area, a four-factor information display area, and a numerical value information display area, which will be described later. The display control unit 520 transmits the generated display data to the terminal device 400. The terminal device 400 displays an information display screen on the display unit 450 according to the display data transmitted from the display control unit 520. The display control unit 520 may be referred to as an output control unit.

Figure 2:
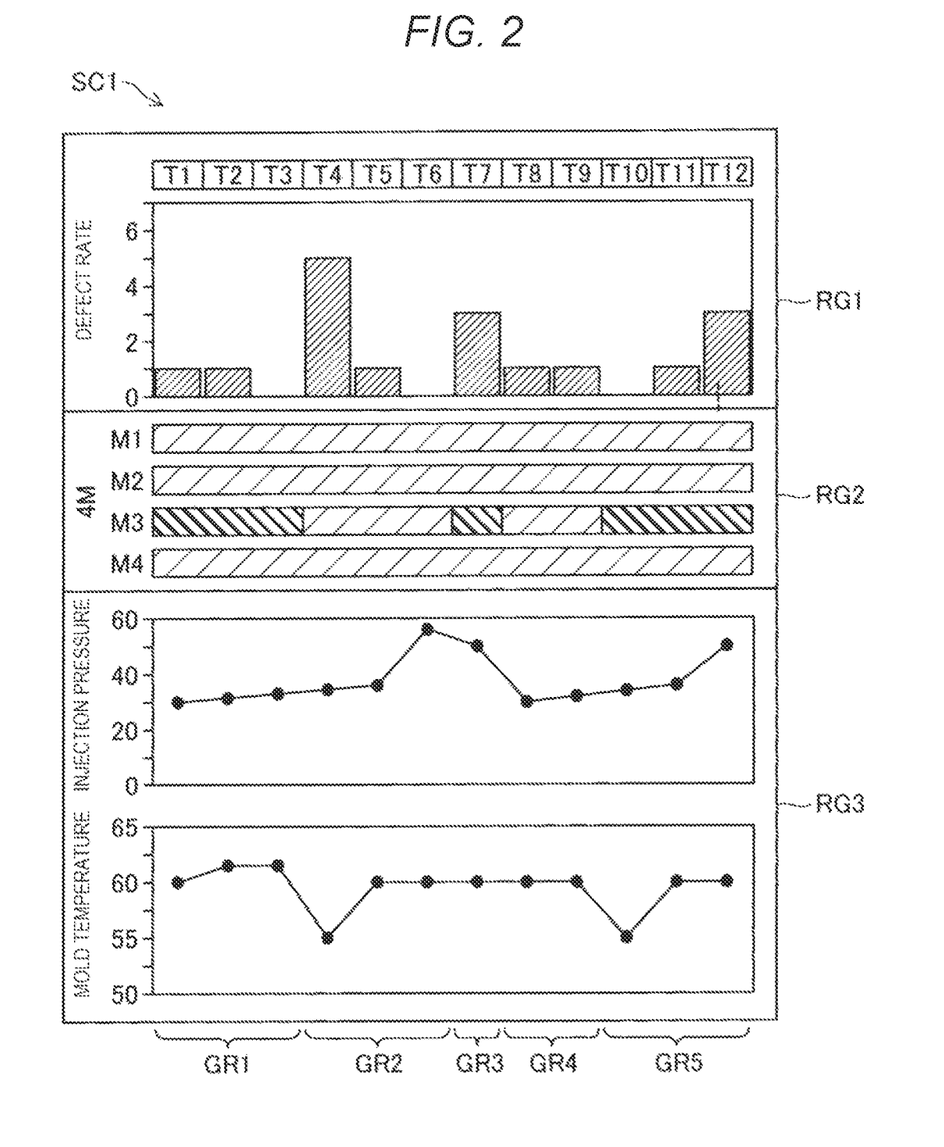
FIG. 2 is an explanatory diagram illustrating an information display screen of a first embodiment.

FIG. 2 is an explanatory diagram illustrating an information display screen SC1 displayed on the display unit 450. The information display screen SC1 is provided with a quality information display area RG1, a four-factor information display area RG2, and a numerical value information display area RG3 in order from the top. However, the order can be arranged as any order. A horizontal axis of the areas RG1 to RG3 is a time axis, and the quality information display area RG1, the four-factor information display area RG2, and the numerical value information display area RG3 have a common time axis. That is, the information displayed in the quality information display area RG1, the information displayed in the four-factor information display area RG2, and the information displayed in the numerical value information display area RG3 are displayed in the same chronological order. In the present embodiment, the horizontal axis is the time axis, but in other embodiments, the horizontal axis may be defined based on information on a production amount such as the number of shots and the number of lots.

The quality information is displayed in the quality information display area RG1 in chronological order. In the present embodiment, labels indicating periods T1 to T12 are displayed in an upper part of the quality information display area RG1. In a lower part of the quality information display area RG1, a defect rate of the molded product in each of the periods T1 to T12 is displayed as a bar graph. The defect rate in each of the periods T1 to T12 is calculated by the display control unit 520. The display control unit 520 can calculate the defect rate in each of the periods T1 to T12 using the inspection result data. In another embodiment, the number of defects may be displayed as the bar graph in the quality information display area RG1 instead of the defect rate. In the quality information display area RG1, the defect rate and the number of defects of the molded product in each of the periods T1 to T12 may be displayed as a line graph.

The four-factor information display area RG2 displays the four-factor information in chronological order. In the present embodiment, status of the four factors of production in each of the periods T1 to T12 is displayed as a band graph in the four-factor information display area RG2. The band graph indicates the status of the four factors of production in each of the periods T1 to T12 by a color and a pattern of the band. In the example illustrated in FIG. 2, four band graphs are displayed in the four-factor information display area RG2. The four band graphs indicate the status of the four factors of production related to different items. Each of the band graphs indicates, for example, status such as who is in charge of the operation of the injection molding machine 100, who is in charge of the inspection by the inspection device 300, what molding conditions are set, which material lot is used as the material for the molded product, and which mold is mounted on the injection molding machine 100. The number of the band graphs displayed in the four-factor information display area RG2 may be one, or may be two or more.

In the numerical value information display area RG3, the numerical value information on the molding process is displayed in chronological order. As described above, the molding condition includes a plurality of items such as an injection pressure, a mold temperature, and a mold clamping pressure. In the present embodiment, the measured values for each of the items of molding conditions are displayed, as the line graph, in the numerical value information display area RG3. The line graph indicates an average value or a median value of the measured values in each of the periods T1 to T12. The average value and the median value of the measured values in each of the periods T1 to T12 are calculated by the display control unit 520. The display control unit 520 can calculate the average value and the median value of the measured values in each of the periods T1 to T12 using the numerical data. The line graph may display a raw value of the measured value. In the example illustrated in FIG. 2, two line graphs are displayed side by side in the numerical value information display area RG3. The line graph in an upper part indicates the average value of the measured values of the injection pressure, and the line graph in a lower part indicates the average value of the measured values of the mold temperature. The number of line graphs displayed in the numerical value information display area RG3 may be one, or may be three or more. The line graphs displayed in the numerical value information display area RG3 may indicate the set value instead of the measured value.

The display control unit 520 classifies the quality information, the four-factor information, and the numerical value information into a plurality of groups for the periods divided according to the time when the four factors of production are changed, and causes the display unit 450 to display the plurality of groups of information. In the example illustrated in FIG. 2, as displayed in the four-factor information display area RG2, the conditions of the four factors of production are changed at start time of the period T1, start time of the period T4, start time of the period T7, start time of the period T8, start time of the period T10, and end time of the period T12. The display control unit 520 classifies the quality information, the four-factor information, and the numerical value information into a first group GR1 from the start time of the period T1 to the end time of the period T3, a second group GR2 from the start time of the period T4 to the end time of the period T6, a third group GR3 from the start time of the period T7 to the end time of the period T7, a fourth group GR4 from the start time of the period T8 to the end time of the period T9, and a fifth group GR5 from the start time of the period T10 to the end time of the period T12, and causes the display unit 450 to display the information in group units.

Figure 3:
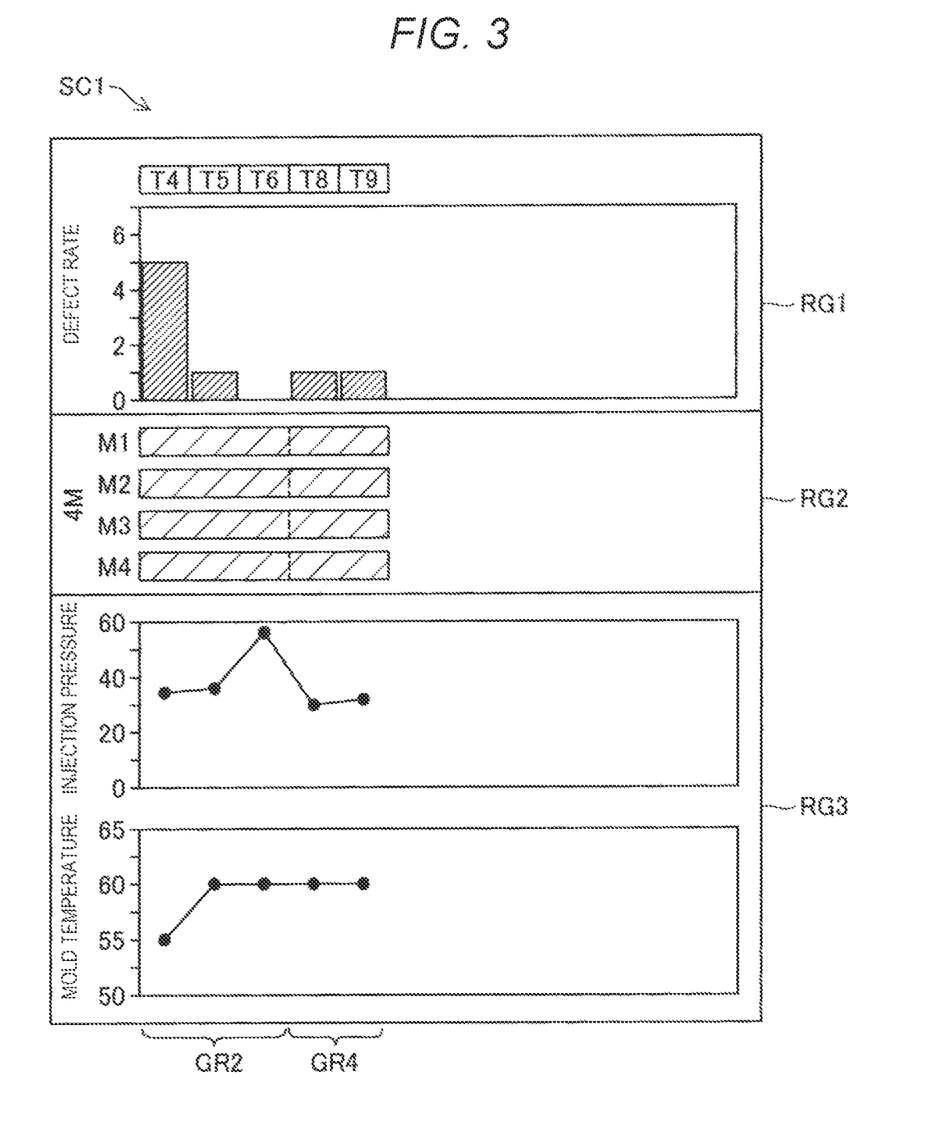
FIG. 3 is a first explanatory diagram illustrating a state in which displayed groups are narrowed down.
Figure 4:
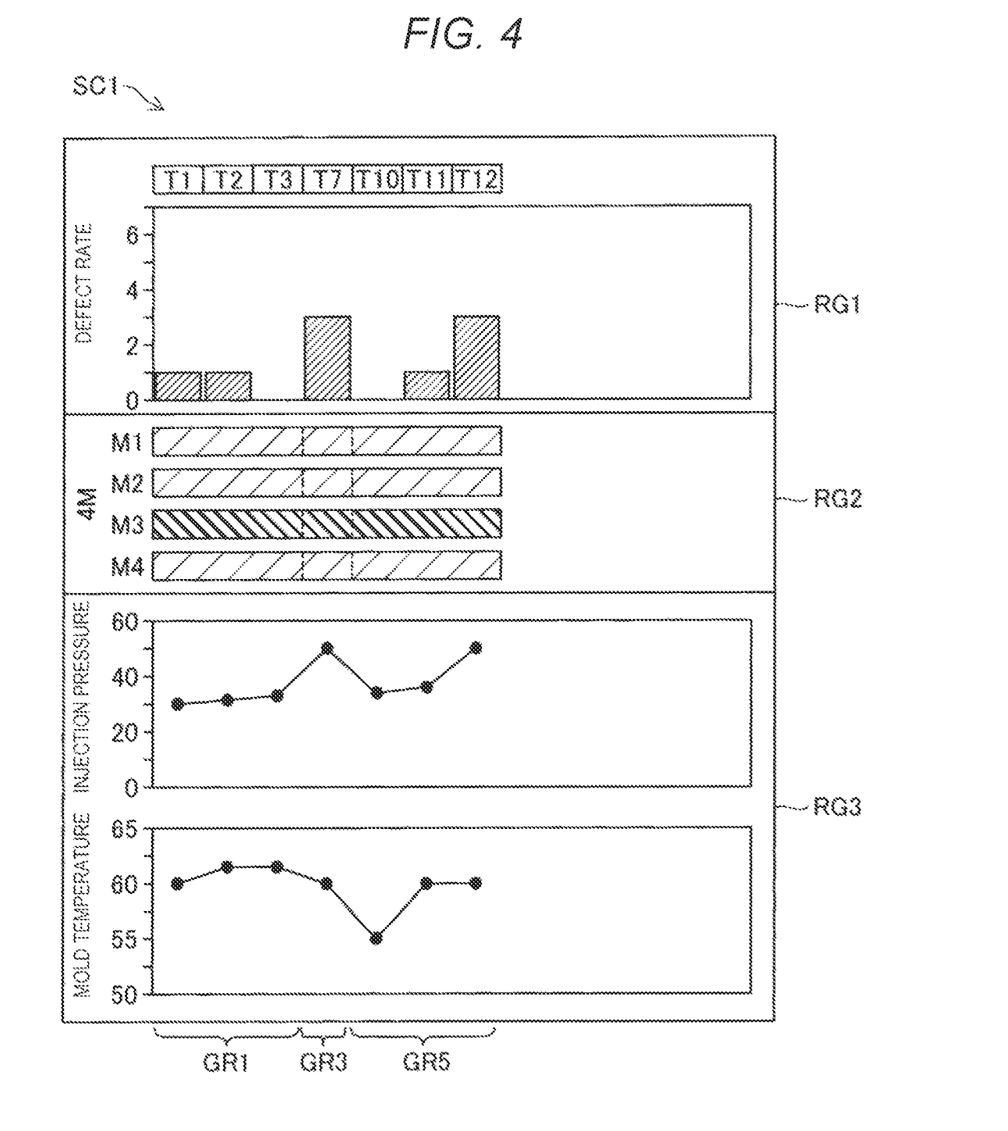
FIG. 4 is a second explanatory diagram illustrating a state in which the displayed groups are narrowed down.

FIG. 3 is a first explanatory diagram illustrating the information display screen SC1 in a state where groups corresponding to specified conditions are displayed. FIG. 4 is a second explanatory diagram illustrating the information display screen SC1 in a state where the groups corresponding to specified conditions are displayed. In the present embodiment, the display control unit 520 can cause the display unit 450 to display the information display screen SC1 in which the groups corresponding to the conditions related to the four factors of production specified by a user are displayed and groups not corresponding to the conditions are hidden. The user can specify the above-described conditions via the terminal device 400.

For example, the band graph of an item "M3" of the four-factor information display area RG2 illustrated in FIG. 2 indicates that, from the start time of the period T1 to the end time of the period T3, from the start time of the period T7 to the end time of the period T7, and from the start time of the period T10 to the end time of the period T12, a material of a material lot "B" is used for injection molding, and indicates that, from the start time of the period T4 to the end time of the period T6, and from the start time of the period T8 to the end time of the period T9, a material of a material lot "A" is used for injection molding. When the conditions of the material lot "A" is specified by the user, as illustrated in FIG. 3, the display control unit 520 causes the display unit 450 to display the information display screen SC1 in which the second group GR2 and the fourth group GR4 corresponding to the conditions are displayed and the first group GR1, the third group GR3, and the fifth group GR5 not corresponding to the conditions are hidden. Meanwhile, when the conditions of the material lot "B" is specified by the user, as illustrated in FIG. 4, the display control unit 520 causes the display unit 450 to display the information display screen SC1 in which the first group GR1, the third group GR3, and the fifth group GR5 corresponding to the conditions are displayed and the second group GR2 and the fourth group GR4 not corresponding to the conditions are hidden.

In injection molding, the defect rate may generally increase immediately after the material lot is changed. When the analysis is performed with reference to the information display screen SC1 of FIG. 2, the period T4 and the period T7 are periods immediately after the material lot is changed, and thus, it may be concluded that the increase in the defect rate in the period T4 and the increase in the defect rate in the period T7 are simply due to the change in the material lot. Further, with reference to the information display screen SC1 in FIG. 2, the period T12 is a period after a sufficient time elapses from the change of the material lot, and thus, it is considered that the increase in the defect rate in the period T12 is not due to the change of the material lot but due to other causes. For example, since the injection pressure is relatively high in the period T12, it is considered that the increase in the defect rate in the period T12 is due to the high injection pressure. However, although the injection pressure in the period T12 is lower than the injection pressure in the period T6, the defect rate in the period T12 is higher than the defect rate in the period T6. Thus, regarding whether the increase in the defect rate in the period T12 is due to the high injection pressure, confirmation cannot be obtained only by referring to the information display screen SC1 of FIG. 2, and verification is required before taking measures for reducing the defect rate.

On the other hand, in the present embodiment, as illustrated in FIG. 3, only the information when the material of the material lot "A" is used for injection molding can be displayed on the information display screen SC1. By referring to the information display screen SC1 of FIG. 3, it can be seen that when the material of the material lot "A" is used for injection molding, the defect rate increases when the mold temperature decreases, and the defect rate does not increase even though the injection pressure increases. Thus, it can be noticed that the increase in the defect rate in the period T4 may be caused not only by the change of the material lot but also by the decrease in the mold temperature.

Further, in the present embodiment, as illustrated in FIG. 4, only the information when the material of the material lot "B" is used for injection molding can be displayed on the information display screen SC1. By referring to the information display screen SC1 of FIG. 4, it can be seen that when the material of the material lot "B" is used for injection molding, the defect rate increases when the injection pressure increases, and the defect rate does not increase even though the mold temperature decreases. Thus, it can be noticed that the increase in the defect rate in the period T7 may be caused not only by the change of the material lot but also by the increase in the injection pressure. Further, it can be identified that the increase in the defect rate in the period T12 is caused by the increase in the injection pressure.

When the correlation between the measured value related to the molding process and the defect rate is not understood, it is difficult to appropriately set a control value for outputting an error or alert during injection molding. When a difference between an upper limit and a lower limit of the control value is too small, useless errors or alerts are frequently output, and the production efficiency of the molded product decreases. On the other hand, when the difference between the upper limit and the lower limit of the control value is too large, no error or alert is output, the detection of abnormality is delayed, and the defect rate of the molded product increases. In the present embodiment, it is possible to understand the correlation between the measured value and the defect rate according to the status of the four factors of production, and thus, when setting the control value for outputting the error or alert, it is possible to set the control value according to the status of the four factors of production. Accordingly, the error or alert can be output in time, it is thus possible to suppress the decrease in the production efficiency of the molded product and the increase in the defect rate.

According to the molding machine management device 500 in the present embodiment described above, the display control unit 520 classifies the measured values related to the molding process into a plurality of groups for the periods classified according to the change time of the four factors of production, and causes the display unit 450 to display the information display screen SC1 in which the measured values related to the molding process are indicated in group units. On the information display screen SC1, in addition to the measured values related to the molding process, the defect rate of the molded product and the status of the four factors of production are displayed in the same chronological order. Thus, the user can analyze the correlation between the measured values related to the molding process and the defect rate of the molded product for the status of the four factors of production by using the information display screen SC1 displayed on the display unit 450. In particular, in the present embodiment, the display control unit 520 can cause, as illustrated in FIGS. 3 and 4, the display unit 450 to display the information display screen SC1 in which the groups corresponding to the conditions related to the four factors of production specified by a user are displayed and the groups not corresponding to the conditions are hidden. Thus, it is possible to easily analyze the correlation between the measured values related to the molding process and the defect rate of the molded product for the status of the four factors of production.

B. Second Embodiment

Figure 5:
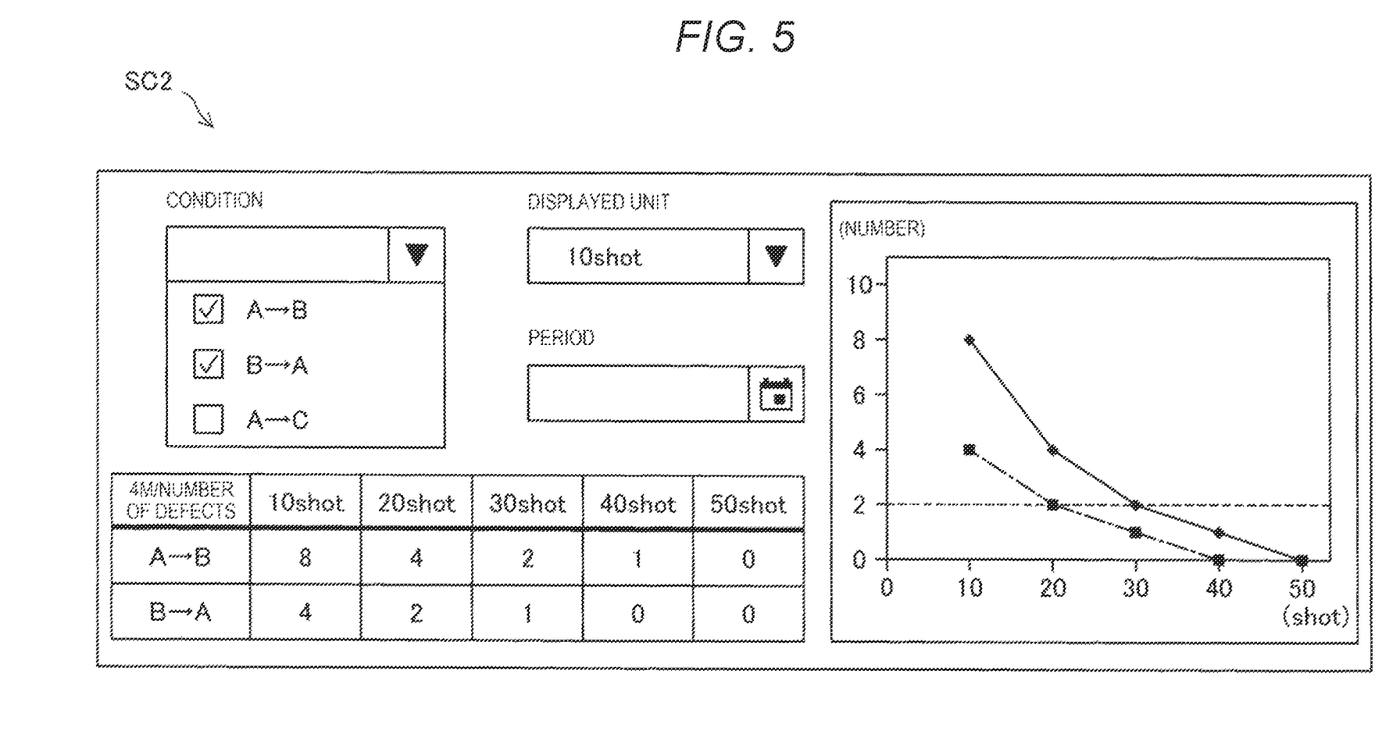
FIG. 5 is an explanatory diagram illustrating an information display screen of a second embodiment.

FIG. 5 is an explanatory diagram illustrating an information display screen SC2 displayed by the molding machine management device 500 of a second embodiment. In the molding machine management device 500 of the second embodiment, when a condition related to a change order of the four factors of production is specified, as illustrated in FIG. 5, the display control unit 520 causes the display unit 450 to display the information display screen SC2 indicating information belonging to a group corresponding to the specified condition among the plurality of groups, which is different from the first embodiment. Other configurations are the same as those in the first embodiment unless otherwise specified.

As an example, the information display screen SC2 illustrated in FIG. 5 indicates a transition of the number of defects when a mold used for injection molding is changed from a mold "A" to a mold "B" and a transition of the number of defects when the mold used for injection molding is changed from the mold "B" to the mold "A" by a line graph. The horizontal axis of the line graph represents the number of shots, and the vertical axis thereof represents the number of defects. In the example illustrated in FIG. 5, the number of defects for every 10 shots is indicated. In the example illustrated in FIG. 5, a material having a relatively high melting temperature is used when the mold "A" is used, and a material having a relatively low melting temperature is used when the mold "B" is used. A set value of the mold temperature when the mold "A" is used is higher than a set value of the mold temperature when the mold "B" is used. FIG. 5 indicates that the number of defects when the mold "B" is changed to the mold "A" is smaller than the number of defects when the mold "A" is changed to the mold "B". Immediately after the mold "A" is changed to the mold "B", heat generated when the mold is used remains in the mold clamping device and the injection device, and it is considered that the fact that the mold temperature is higher than the set value is the cause of the increase in the number of defects when the mold "A" is changed to the mold "B". In another embodiment, the horizontal axis of the line graph may represent time instead of the number of shots. The line graph may display quality information such as a defect rate instead of the number of defects, may display numerical value information on the molding process such as a set value or measured value of the injection molding machine 100, or may display the numerical value information on the molding process and the quality information.

According to the molding machine management device 500 in the present embodiment described above, it is possible to analyze how a difference in the change order of the four factors of production causes a difference in the quality of the molded product, and it is possible to reduce the number of defects by using the analysis result. In particular, in the present embodiment, the display control unit 520 causes the relation between the number of shots and the number of defects to be displayed, and thus it is possible to understand how many times discarding is performed to improve the quality of the molded product. Thus, it is possible to reduce a consumption amount of the material due to excessive number of times of discarding, and it is possible to reduce occurrence of defective products due to insufficient number of times discarding.

C. Third Embodiment

Figure 6:
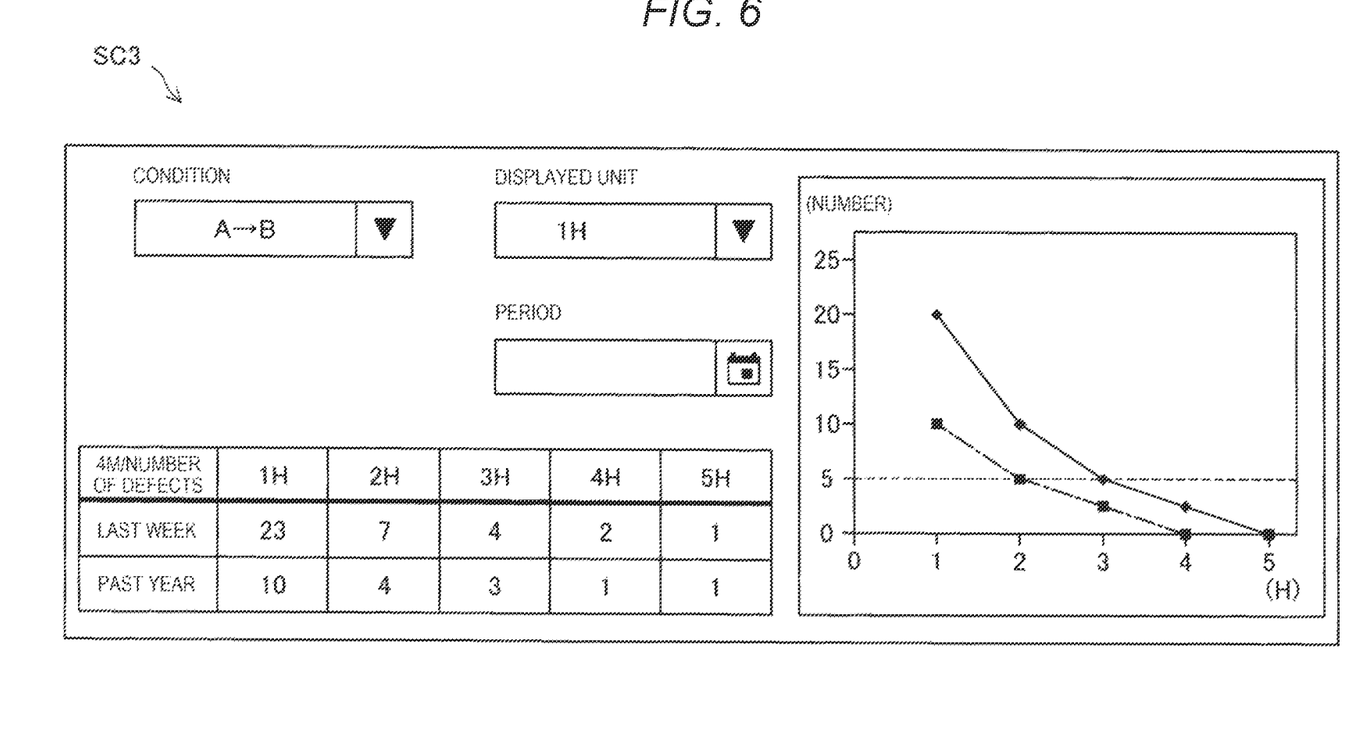
FIG. 6 is an explanatory diagram illustrating an information display screen of a third embodiment.

FIG. 6 is an explanatory diagram illustrating an information display screen SC3 displayed by the molding machine management device 500 of a third embodiment. In the molding machine management device 500 of the third embodiment, when a condition related to a change order of the four factors of production is specified, as illustrated in FIG. 6, the display control unit 520 causes the display unit 450 to display the information display screen SC3 indicating information belonging to a group corresponding to the specified condition among the plurality of groups, which is different from the first embodiment. Other configurations are the same as those in the first embodiment unless otherwise specified.

As an example, the information display screen SC3 illustrated in FIG. 6 indicates a transition of number of defects per hour after changing from a mold "A" to a mold "B" in the last week, and a transition of the number of defects per hour after changing from the mold "A" to the mold "B" in the past year by a line graph. The horizontal axis of the line graph represents the time, and the vertical axis thereof represents the number of defects. FIG. 6 indicates that the number of defects in the last week is larger than the number of defects in the past year. In the example illustrated in FIG. 6, a material having a relatively high melting temperature is used when the mold "A" is used, and a material having a relatively low melting temperature is used when the mold "B" is used. A set value of the mold temperature when the mold "A" is used is higher than a set value of the mold temperature when the mold "B" is used. As illustrated in FIG. 6, since the number of defects decreases as time passes, it can be seen that the number of defects decreases if the mold temperature sufficiently decreases. Thus, a user can take measures in order to reduce the number of defects such as setting waiting time of predetermined duration between changing the mold and trial casting, lowering a set temperature of the mold at start time of production with the mold "B" than usual cases, or changing the number of times of purges and the number of times of discarding. Alternatively, when formulating a production plan, it is possible to make a plan to change from the mold "B" to the mold "A" instead of changing from the mold "A" to the mold "B", and thus, the defect rate can be reduced only by changing the change order of the molds. In another embodiment, the horizontal axis of the line graph may represent information on the production amount such as the number of shots and the number of lots instead of the time. The line graph may display quality information such as a defect rate instead of the number of defects, may display numerical value information on the molding process such as a set value or measured value of the injection molding machine 100, or may display the numerical value information on the molding process and the quality information.

According to the molding machine management device 500 in the present embodiment described above, it is possible to analyze how a difference in the change order of the four factors of production causes a difference in the quality of the molded product, and it is possible to reduce the number of defects by using the analysis result. In particular, in the present embodiment, it is possible to compare an average transition in the number of defects immediately after changing the mold in the last week with an average transition in the number of defects immediately after changing the mold in the past year. In the example illustrated in FIG. 6, an average value of the number of defects in the past week is larger than an average value of the number of defects in the most recent year. Thus, in the last week, for example, it is possible to take appropriate measures at an early stage, such as determining that there is an accidental factor such as a mold replacement work mistake to investigate presence or absence of a work mistake, or proceeding to investigate presence or absence of causes other than the mold replacement work mistake.

D. Fourth Embodiment

Figure 7:
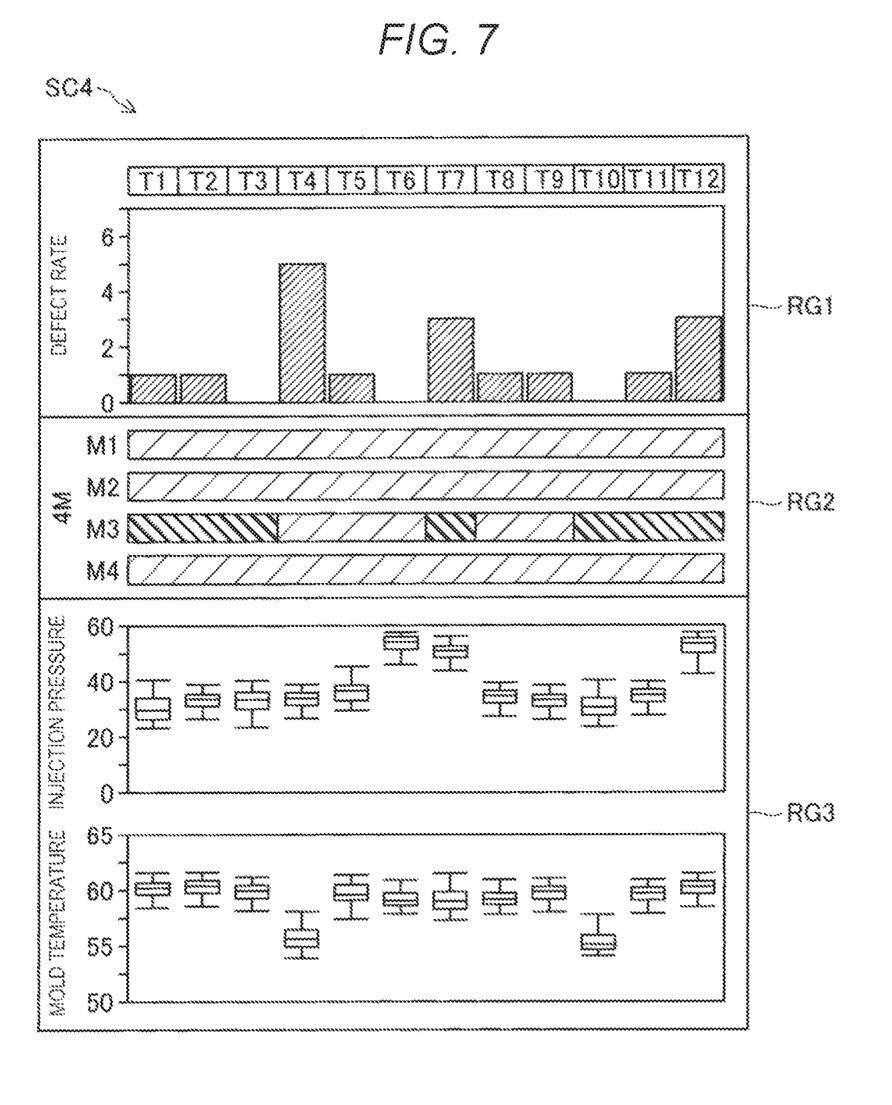
FIG. 7 is an explanatory diagram illustrating an information display screen of a fourth embodiment.

FIG. 7 is an explanatory diagram illustrating an information display screen SC4 displayed by the molding machine management device 500 of a fourth embodiment. In the fourth embodiment, as illustrated in FIG. 7, numerical value information is displayed, in the numerical value information display area RG3 of the information display screen SC4, not by a line graph but by a statistical diagram, which is different from the first embodiment. Other configurations are the same as those in the second embodiment unless otherwise specified.

As illustrated in FIG. 7, in the present embodiment, the display control unit 520 causes the statistical diagram illustrating variations of measured values measured in the periods T1 to T12 to be displayed in the numerical information display area RG3 of the information display screen SC4. The display control unit 520 causes a boxplot, as the statistical diagram illustrating the variations of measured values measured in the periods T1 to T12, to be displayed. In another embodiment, the display control unit 520 may cause a graph indicating a normal distribution instead of a boxplot to be displayed. The display control unit 520 may switch, when the user performs a predetermined switching operation, between a display mode in which the variations of measured values measured in the periods T1 to T12 are displayed in the line graph as illustrated in FIG. 2 and a mode in which the variations are displayed in the statistical diagram as illustrated in FIG. 7.

According to the molding machine management device 500 in the present embodiment described above, since the display control unit 520 causes the variations of the measured values in each of the periods T1 to T12 to be displayed in the statistical diagram, the user can perform the analysis in consideration of the variations of the numerical value information.

E. Other Embodiments (E1) In each of the above-described embodiments, the molding machine management system 10 includes the injection molding machine 100. On the other hand, the molding machine management system 10 may include a press molding machine, an extrusion molding machine, a blow molding machine, or a casting machine instead of the injection molding machine 100.

(E2) In each of the above-described embodiments, the display control unit 520 of the management device 500 causes the display unit 450 to display the information display screens SC1 to SC4 indicating the numerical value information, the quality information, and the four-factor information. On the other hand, the display control unit 520 may output the numerical value information, the quality information, and the four-factor information to, for example, a printer, a plotter, a projector, a speaker, or the like. In this case, the printer, plotter, projector, speaker, or the like can be referred to as an output unit, and the display control unit 520 can be referred to as an output control unit.

F. Other Aspects

The present disclosure is not limited to the embodiments described above, and can be implemented in various forms without departing from the scope of the present disclosure. For example, the present disclosure can be implemented in the following aspects. In order to solve a part of or all of problems of the present disclosure, or to achieve a part of or all of effects of the present disclosure, technical features in the above-described embodiments corresponding to technical features in the following aspects can be replaced or combined as appropriate. Technical features can be deleted as appropriate unless the technique features are described as essential in the present specification.

(1) According to one aspect of the present disclosure, a molding machine management device that is able to couple to a molding machine is provided. The molding machine management device includes a storage unit configured to store, in chronological order, numerical value information on a molding process when a molded product is molded by the molding machine and four-factor information on four factors of production which includes a man, a machine, a material, and a method when the molded product is produced, and an output control unit configured to classify the numerical value information into a plurality of groups for periods divided according to time when the four factors of production changes, and output the numerical value information classified into the plurality of groups to an output unit in group units.

According to the molding machine management device of this aspect, it is possible to analyze the numerical value information for status of the four factors of production by using the numerical value information output to the output unit in group units.

(2) In the molding machine management device of the above-described aspect, when a first condition related to the four factors of production is specified, the output control unit may output the numerical value information belonging to a group corresponding to the first condition, among the plurality of groups, to the output unit.

According to this aspect of the molding machine management device, it is possible to facilitate the analysis of the numerical value information for the status of the four factors of production.

(3) In the molding machine management device of the above-described aspect, when a second condition related to a change order of the four factors of production is specified, the output control unit may output at least one of the numerical value information belonging to a group corresponding to the second condition, among the plurality of groups, and quality information indicating quality of the molded product, which is information associated with the numerical value information belonging to the group corresponding to the second condition, to the output unit.

According to the molding machine management device of this aspect, it is possible to perform analysis in consideration of a change history of the four factors of production.

(4) In the molding machine management device of the above-described aspect, the output control unit may output a statistical diagram of the numerical value information to the output unit.

According to the molding machine management device of this aspect, it is possible to perform an analysis in consideration of variations of the numerical value information by using the statistical diagram output to the output unit.

The present disclosure can also be implemented in various aspects other than the molding machine management device. For example, the present disclosure can be implemented in aspects of a molding machine management system, a molding machine management method, or the like.

What is claimed is:

1. A molding machine management device that is configured to couple to a molding machine for causing a processor to execute a program stored in a memory, the molding machine management device comprising executing on the processor the steps of:

receiving numerical data from the molding machine, the numerical data including set values and measured values of molding conditions, the molding conditions including an injection pressure and a mold temperature, each set value of the set values being associated with a time or a number of shots when the each set value is set, each measured value of the measured values being associated with a time or a number of shots when the each measured value is measured;

receiving four-factor information including four factors of production, the four factors relating to a man, a machine, a material, and a method, the man being an operator of the production, a machine being a device used for the production, the material being used to make a molded product molded by the molding machine, the method being used for the production;

receiving inspection result data, the inspection result data including a dimensional defect and an appearance defect of the molded product inspected based on an image of the molded product captured by a camera, each result data of the inspection result data being associated with a time or a number of shots when an inspection is conducted;

determining a plurality of periods, any of the four factors being the same during each period of the plurality of periods, and one of the four factors being different among two adjacent periods of the plurality of periods;

displaying the numerical data, the four-factor information, and the inspection result data by the plurality of periods at first, second, and third regions of a display, respectively;

determining whether a correlation among the numerical data, the four-factor information, and the inspection result data is within a control range; and providing an alert when the processor determines that the correlation is outside of the control range.

2. The molding machine management device according to claim 1, wherein the processor is configured to cause the display to display a statistical diagram of the numerical data.

* * * * *